(12) United States Patent
Abe et al.

(10) Patent No.: US 9,340,632 B2
(45) Date of Patent: May 17, 2016

(54) PROCESS FOR PRODUCING FLUORINATED COPOLYMER

(71) Applicant: Asahi Glass Company, Limited, Chiyoda-ku (JP)

(72) Inventors: Kaori Abe, Chiyoda-ku (JP); Shigeru Aida, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 101 days.

(21) Appl. No.: 13/975,726

(22) Filed: Aug. 26, 2013

(65) Prior Publication Data

US 2014/0088278 A1    Mar. 27, 2014

(30) Foreign Application Priority Data

Sep. 27, 2012  (JP) ................. 2012-214581

(51) Int. Cl.
    C08F 214/26   (2006.01)
    C08F 6/00     (2006.01)
    C08F 228/02   (2006.01)
    B01D 1/00     (2006.01)

(52) U.S. Cl.
    CPC ........... *C08F 214/262* (2013.01); *C08F 214/26* (2013.01); *C08F 228/02* (2013.01); *B01D 1/0064* (2013.01); *Y02P 20/121* (2015.11)

(58) Field of Classification Search
    CPC ....................................................... C08F 6/003
    See application file for complete search history.

(56) References Cited

U.S. PATENT DOCUMENTS

| 3,041,317 | A | * | 6/1962 | Gibbs | .................. C07C 309/81 521/30 |
| 4,116,888 | A | * | 9/1978 | Ukihashi | ............. C08F 214/184 521/27 |
| 6,337,373 | B1 | * | 1/2002 | Formaro | ............... C08F 255/00 525/193 |
| 6,429,258 | B1 | * | 8/2002 | Morgan et al. | ................. 524/805 |
| 8,344,192 | B2 | * | 1/2013 | Isaka | ....................... C08F 6/003 526/242 |
| 2002/0111441 | A1 | * | 8/2002 | Kendrick et al. | ............... 526/64 |
| 2003/0023015 | A1 | * | 1/2003 | Tatemoto | ............... C08F 6/003 526/243 |
| 2010/0048956 | A1 | * | 2/2010 | Isaka et al. | ...................... 568/32 |
| 2014/0100344 | A1 | * | 4/2014 | Aida et al. | .................... 526/243 |

FOREIGN PATENT DOCUMENTS

| JP | 3781498 | 3/2006 |
| WO | WO 2009/133902 A1 | 11/2009 |
| WO | WO 2012173153 A1 * | 12/2012 |

OTHER PUBLICATIONS

"Applications: Free Radical Initiators", Sigma Aldrich, retrieved Mar. 2015.*
U.S. Appl. No. 14/099,477, filed Dec. 6, 2013, Aida, et al.

* cited by examiner

*Primary Examiner* — Nicole M Buie-Hatcher
(74) *Attorney, Agent, or Firm* — Oblon, McClelland, Maier & Neustadt, L.L.P.

(57) ABSTRACT

A process for producing a fluorinated copolymer includes polymerizing a fluorinated monomer having a carboxylic acid functional group or a sulfonic acid functional group and tetrafluoroethylene by a solution polymerization method in a polymerization medium in the presence of a polymerization initiator to obtain a mixture. The mixture contains a fluorinated copolymer, an unreacted fluorinated monomer having the carboxylic acid functional group or the sulfonic acid functional group, and the polymerization medium. The mixture is continuously or intermittently transferred to an evaporation container equipped with a stirring machine and heated in the evaporation container with stirring to evaporate and recover a mixed liquid. The mixed liquid contains the unreacted fluorinated monomer and the polymerization medium with which the polymerization initiator is mixed. The recovered mixed liquid is heated to decompose the polymerization initiator.

22 Claims, No Drawings

PROCESS FOR PRODUCING FLUORINATED COPOLYMER

BACKGROUND OF INVENTION

1. Field of Invention

The present invention relates to a process for producing a fluorinated copolymer for an ion exchange membrane having carboxylic acid functional groups or sulfonic acid functional groups.

2. Discussion of Background

As an ion exchange membrane to be used for an alkali chloride electrolysis method in which an alkali chloride aqueous solution such as salt water is electrolyzed to produce an alkali hydroxide and chlorine, a membrane comprising a fluorinated copolymer having carboxylic acid functional groups or sulfonic acid functional groups has been known. The fluorinated copolymer is obtainable by copolymerizing a fluorinated monomer having a carboxylic acid functional group or a sulfonic acid functional group and a fluorinated olefin particularly tetrafluoroethylene (hereinafter referred to as TFE).

As a polymerization method, an emulsion polymerization method, a solution polymerization method, a suspension polymerization method or a bulk polymerization method may, for example, be mentioned. After the fluorinated copolymer is obtained by such a polymerization method, a step is required to separate and recover the polymerization medium or the unreacted monomer from the obtained fluorinated copolymer, and the following methods have been known. (1) A method of pouring a slurry obtained by solution polymerization to a poor solvent such as methanol to agglomerate the fluorinated copolymer (for example, Patent Document 1). (2) A method of purging the pressure of the reactor after polymerization, and evacuate the reactor by means of a cold trap with stirring to recover the polymerization medium and the unreacted monomer (Patent Document 2).

However, in the method (1), it is necessary to carry out agglomeration operation repeatedly several times and to distill off the solvent used for agglomeration to recover the fluorinated monomer, in order that the fluorinated monomer having a carboxylic acid functional group or a sulfonic acid functional group which is expensive, is completely recovered, thus leading to a high cost.

In the method (2), since an undecomposed initiator used for the polymerization is included in the recovered mixed liquid of the polymerization medium and the unreacted monomer, if the recovered polymerization medium and unreacted monomer are reused for the polymerization, a fluorinated copolymer having an unintended composition may form in the step of charging the monomer and the polymerization medium to a reactor and increasing the temperature and the pressure, whereby the current efficiency of the obtainable ion exchange membrane may be low. If distillation is conducted to remove the undecomposed initiator from the recovered mixed liquid, it will take long to recover the monomer and the productivity will be lowered.

Accordingly, a method has been desired in which the polymerization medium and the fluorinated monomer having a carboxylic acid functional group or a sulfonic acid functional group are recovered efficiently at a low cost without lowering the productivity, and are reused for polymerization without lowering the performance as an ion exchange membrane.
Patent Document 1: WO2009/133902
Patent Document 2: Japanese Patent No. 3,781,498

SUMMARY OF INVENTION

The present invention provides a method for recovering a polymerization medium and a fluorinated monomer having a carboxylic acid functional group or a sulfonic acid functional group efficiently at a low cost without lowering the productivity, and reusing them for polymerization without lowering the performance as an ion exchange membrane.

The process for producing a fluorinated copolymer according to a first embodiment of the present invention comprises the following steps (I) to (III):

(I) a step of polymerizing a fluorinated monomer having a carboxylic acid functional group or a sulfonic acid functional group and TFE in a polymerization medium in the presence of a polymerization initiator to obtain a mixture containing a fluorinated copolymer, the unreacted monomer and the polymerization medium;

(II) a step of continuously or intermittently transferring the mixture to an evaporation container equipped with a stirring machine and heating the mixture in the evaporation container with stirring to evaporate and recover the unreacted fluorinated monomer having a carboxylic acid functional group or a sulfonic acid functional group and the polymerization medium; and (III) a step of heating the recovered mixed liquid containing the unreacted fluorinated monomer having a carboxylic acid functional group or a sulfonic acid functional group and the polymerization medium recovered in the step (II) to decompose the polymerization initiator.

Further, the process for producing a fluorinated copolymer according to a second embodiment of the present invention comprises the following steps (I') to (III'):

(I') a step of polymerizing a fluorinated monomer having a carboxylic acid functional group or a sulfonic acid functional group and TFE in the presence of a polymerization initiator to obtain a mixture containing a fluorinated copolymer and the unreacted monomer;

(II') a step of continuously or intermittently transferring the mixture to an evaporation container equipped with a stirring machine and heating the mixture in the evaporation container with stirring to evaporate and recover the unreacted monomer; and (III') a step of heating the unreacted fluorinated monomer having a carboxylic acid functional group or a sulfonic acid functional group recovered in the step (II') to decompose the polymerization initiator.

The monomer having a carboxylic acid functional group or a sulfonic acid functional group is preferably a perfluoromonomer.

The fluorinated monomer having a carboxylic acid functional group is preferably a fluorovinyl ether represented by the following formula (1):

wherein X is a fluorine atom or a trifluoromethyl group, X' is a fluorine atom or a trifluoromethyl group, $A^1$ is a carboxylic acid functional group, p is 0 or 1, q is an integer of from 0 to 12, r is an integer of from 0 to 3, s is 0 or 1, t is an integer of from 0 to 12, u is an integer of from 0 to 3, $1 \leq p+s$, and $1 \leq r+u$.

The fluorinated monomer having a sulfonic acid functional group is preferably a fluorovinyl or a fluorovinyl ether represented by the following formula (2), (3) or (4):

-continued

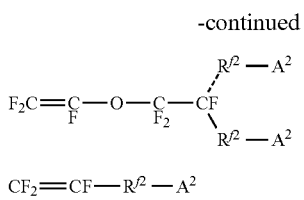

$$CF_2\!\!=\!\!CF\!-\!R^{f2}\!-\!A^2 \qquad (4)$$

wherein $R^{f2}$ is a $C_{1-20}$ perfluoroalkylene group, which may have an etheric oxygen atom and which may be linear or branched, and $A^2$ is a sulfonic acid functional group.

In the step (III), the heat treatment temperature is preferably at least the 10-hour half-life temperature of the polymerization initiator used.

In the step (III'), the heat treatment temperature is preferably at least the 10-hour half-life temperature of the polymerization initiator used.

It is preferred to reuse the recovered mixed liquid treated in the step (III) as at least part of the fluorinated monomer to be used for the step (I).

It is preferred to reuse the fluorinated monomer treated in the step (III') as at least part of the fluorinated monomer to be used in the step (I').

According to the process for producing a fluorinated copolymer of the present invention, the unreacted monomer recovered from the mixture containing the fluorinated copolymer and the unreacted monomer can be recovered and reused efficiently, and accordingly a fluorinated copolymer to be used for an ion exchange membrane for alkali chloride electrolysis can be produced at a low cost.

DETAILED DESCRIPTION OF PREFERRED EMBODIMENTS

<Process for Producing Fluorinated Copolymer>

The process for producing a fluorinated copolymer according to a first embodiment of the present invention is a process comprising the following steps (I) to (III), applicable in the case of a polymerization method using a polymerization medium, such as an emulsion polymerization method, a solution polymerization method or a suspension polymerization method.

(I) A step of polymerizing a fluorinated monomer having a carboxylic acid functional group or a sulfonic acid functional group and TFE in a polymerization medium in the presence of a polymerization initiator to obtain a mixture containing a fluorinated copolymer, the unreacted monomer and the polymerization medium.

(II) A step of continuously or intermittently transferring the mixture to an evaporation container equipped with a stirring machine and heating the mixture in the evaporation container with stirring to evaporate and recover the unreacted fluorinated monomer having a carboxylic acid functional group or a sulfonic acid functional group and the polymerization medium.

(III) A step of heating the recovered mixed liquid containing the unreacted fluorinated monomer having a carboxylic acid functional group or a sulfonic acid functional group and the polymerization medium recovered in the step (II) to decompose the polymerization initiator.

The process for producing a fluorinated copolymer according to a second embodiment of the present invention is a process comprising the following steps (I') to (III'), applicable in the case of a polymerization method using no polymerization medium (except for monomers) such as a bulk polymerization method.

(I') A step of polymerizing a fluorinated monomer having a carboxylic acid functional group or a sulfonic acid functional group and TFE in the presence of a polymerization initiator to obtain a mixture containing a fluorinated copolymer and the unreacted monomer.

(II') A step of continuously or intermittently transferring the mixture to an evaporation container equipped with a stirring machine and heating the mixture in the evaporation container with stirring to evaporate and recover the unreacted monomer.

(III') A step of heating the unreacted fluorinated monomer having a carboxylic acid functional group or a sulfonic acid functional group recovered in the step (II') to decompose the polymerization initiator.

The fluorinated monomer to be used for the process for producing a fluorinated copolymer of the present invention is not particularly limited so long as it is a fluorinated monomer having a carboxylic acid functional group or a sulfonic acid functional group, and conventional monomers may be used.

The monomer having a carboxylic acid functional group or a sulfonic acid functional group is preferably a perfluoromonomer.

(Fluorinated Monomer Having Carboxylic Acid Functional Group)

The fluorinated monomer having a carboxylic acid functional group is not particularly limited so long as it is a compound having at least one fluorine atom, an ethylenic double bond and a carboxylic acid functional group in its molecule, and known one may be used.

The fluorinated monomer having a carboxylic acid functional group is preferably a fluorovinyl ether represented by the following formula (1) in view of the production cost of the monomer, the reactivity with another monomer and excellent properties of the obtainable fluorinated copolymer.

 (1)

X is a fluorine atom or a trifluoromethyl group. Further, X' is a fluorine atom or a trifluoromethyl group. In a case where both X and X' are present in one molecule, they may be the same or different from each other.

$A^1$ is a carboxylic acid functional group. The carboxylic acid functional group means a carboxylic acid group (—COOH) itself or a functional group capable of being converted to a carboxylic acid group by hydrolysis or neutralization. The functional group capable of being converted to a carboxylic acid group may, for example, be —CN, —COF, —COOR$^1$ (wherein R$^1$ is a $C_{1-10}$ alkyl group), —COOM (wherein M is an alkali metal or a quaternary ammonium salt group), —COONR$^2$R$^3$ (wherein each of R$^2$ and R$^3$ which may be the same or different, is a hydrogen atom or a $C_{1-10}$ alkyl group).

p is 0 or 1, q is an integer of from 0 to 12, r is an integer of from 0 to 3, s is 0 or 1, t is an integer of from 0 to 12, and u is an integer of from 0 to 3, provided that p and s are not simultaneously 0, and r and u are not simultaneously 0, that is, 1≤p+s, and 1≤r+u.

As specific examples of the fluorovinyl ether represented by the formula (1), the following compounds may be mentioned, and in view of easy production, preferred is a compound wherein p=1, q=0, r=1, s=0 or 1, t=1 to 3, and u=0 or 1, particularly preferred is $CF_2\!\!=\!\!CF\!-\!O\!-\!CF_2CF_2\!-\!CF_2\!-\!COOCH_3$:

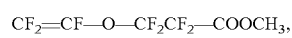

$CF_2=CF-O-CF_2CF_2-CF_2CF_2-COOCH_3$, $CF_2=CF-O-CF_2CF_2-O-CF_2CF_2-COOCH_3$, $CF_2=CF-O-CF_2CF_2-O-CF_2CF_2-CF_2-COOCH_3$, $CF_2=CF-O-CF_2CF_2-O-CF_2CF_2-CF_2CF_2-COOCH_3$, $CF_2=CF-O-CF_2-CF_2CF_2-O-CF_2CF_2-COOCH_3$, $CF_2=CF-O-CF_2CF(CF_3)-O-CF_2CF_2-COOCH_3$, $CF_2=CF-O-CF_2CF(CF_3)-O-CF_2-CF_2CF_2-COOCH_3$.

(Fluorinated Monomer Having Sulfonic Acid Functional Group)

The fluorinated monomer having a sulfonic acid functional group is not particularly limited so long as it is a compound having at least one fluorine atom, an ethylenic double bond and a sulfonic acid functional group in its molecule, and known one may be used.

The fluorinated monomer having a sulfonic acid functional group is preferably a compound represented by the following formula (2), (3) or (4) in view of the production cost of the monomer, the reactivity with another monomer and excellent properties of the obtainable fluorinated copolymer.

$$CF_2=CF-O-R^{f2}-A^2 \quad (2)$$

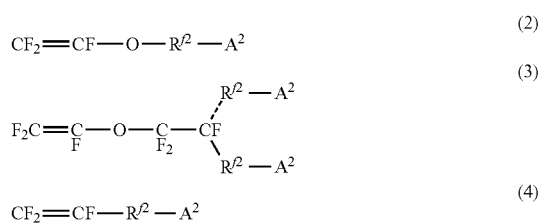
(3)

$$CF_2=CF-R^{f2}-A^2 \quad (4)$$

$R^{f2}$ is a $C_{1-20}$ perfluoroalkylene group, which may have an etheric oxygen atom and which may be linear or branched.

$A^2$ is a sulfonic acid functional group. The sulfonic acid functional group means a sulfonic acid group ($-SO_3H$) itself or a functional group capable of being converted to a sulfonic acid group by hydrolysis or neutralization. The functional group capable of being converted to a sulfonic acid group may, for example, be $-SO_3M$ (wherein M is an alkali metal or a quaternary ammonium salt group), $-SO_2F$, $-SO_2Cl$ or $-SO_2Br$.

As the compound represented by the formula (2), specifically, the following compounds are preferred.

$CF_2=CF-O-(CF_2)_{1-8}-SO_2F$, $CF_2=CF-O-CF_2CF(CF_3)O(CF_2)_{1-8}-SO_2F$, $CF_2=CF[OCF_2CF(CF_3)]_{1-5}SO_2F$.

As the compound represented by the formula (3), specifically, the following compound is preferred.

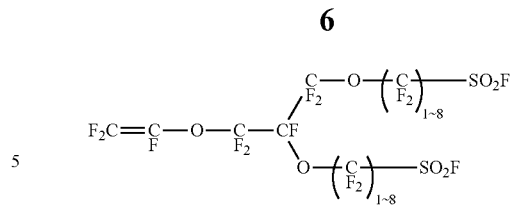

As the compound represented by the formula (4), specifically, the following compounds are preferred.

$CF_2=CF(CF_2)_{0-8}-SO_2F$, $CF_2=CF-CF_2-O-(CF_2)_{1-8}-SO_2F$.

The fluorinated monomer having a sulfonic acid functional group is more preferably the following compounds, in view of easy industrial preparation.

$CF_2=CFOCF_2CF_2SO_2F$, $CF_2=CFOCF_2CF_2CF_2SO_2F$, $CF_2=CFOCF_2CF_2CF_2CF_2SO_2F$, $CF_2=CFOCF_2CF(CF_3)OCF_2CF_2SO_2F$, $CF_2=CFOCF_2CF(CF_3)OCF_2CF_2CF_2SO_2F$, $CF_2=CFOCF_2CF(CF_3)SO_2F$, $CF_2=CFCF_2CF_2SO_2F$, $CF_2=CFCF_2CF_2CF_2SO_2F$, $CF_2=CF-CF_2-O-CF_2CF_2-SO_2F$,

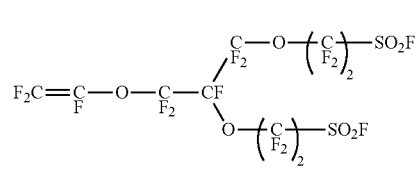

(Another Monomer)

In the present invention, in addition to the fluorinated monomer having a carboxylic acid functional group or a sulfonic acid functional group and TFE, another monomer may further be copolymerized.

Such another monomer may, for example, be $CF_2=CF-R^f$, $CF_2=CF-OR^f$ (wherein $R^f$ is a $C_{1-10}$ perfluoroalkyl group, which may have an etheric oxygen atom and which may be linear or branched), $CF_2=CFO(CF_2)_vCF=CF_2$ (wherein v is an integer of from 1 to 3), chlorotrifluoroethylene ($CF_2=CFCl$), vinylidene fluoride ($CF_2=CH_2$), vinyl fluoride ($CH_2=CHF$) or hexafluoropropylene ($CF_2=CFCF_3$). By copolymerizing another monomer, the flexibility and the mechanical strength of the obtainable ion exchange membrane can be improved. The proportion of another monomer is preferably at most 30 mass % to all the monomers (100 mass %) with a view to maintaining the ion exchange performance.

(Polymerization Initiator)

As the polymerization initiator to be used for the process for producing a fluorinated copolymer of the present invention, a compound copolymerizable with the fluorinated monomer having a carboxylic acid functional group or a sulfonic acid functional group and tetrafluoroethylene is used.

The polymerization initiator may, for example, be a diacyl peroxide (such as disuccinic acid peroxide, benzoyl peroxide, lauroyl peroxide, bis(pentafluoropropionyl) peroxide or diisobutyryl peroxide), an azo compound (such as 2,2'-azobis (2-amidinopropane) hydrochloride, 4,4'-azobis(4-cyanovalerianic acid), dimethyl 2,2'-azobisisobutyrate, azobisisobutyronitrile or 2,2'-azobis(2-methylbutyronitrile), 1,1'-azobis (cyclohexane-1-carbonitrile) or dimethyl 1,1'-azobis(1-cyclohexanecarboxylate)), a peroxyester (such as t-butyl peroxyisobutyrate or t-butyl peroxypivalate), a peroxydicarbonate (such as diisopropyl peroxydicarbonate or bis(2-ethylhexyl)peroxydicarbonate), or a hydroperoxide (such as diisopropylbenzene hydroperoxide).

The polymerization initiator preferably has a 10-hour half-life temperature of at least 30° C., more preferably at least 40° C., further preferably at least 50° C.

(Steps (I) and (I'))

In the case of the production process according to a first embodiment of the present invention, in a reactor, the fluorinated monomer having a carboxylic acid functional group or a sulfonic acid functional group and TFE are polymerized in a polymerization medium in the presence of a polymerization initiator to obtain a mixture (an emulsion, a slurry or the like) containing a fluorinated copolymer, the unreacted monomer and the polymerization medium.

In the case of the production process according to a second embodiment of the present invention, in a reactor, the fluorinated monomer having a carboxylic acid functional group or a sulfonic acid functional group and TFE are polymerized in the presence of a polymerization initiator to obtain a mixture containing a fluorinated copolymer and the unreacted monomer.

The polymerization method is selected from polymerization methods such as an emulsion polymerization method, a solution polymerization method, a suspension polymerization method and a bulk polymerization method. The polymerization method is preferably a solution polymerization method using no fluorinated emulsifying agent having a perfluoroalkyl group having at least 7 carbon atoms, the bioaccumulation property of which is a concern.

The polymerization medium used in the emulsion polymerization method is preferably water.

The emulsifying agent to be used in the emulsion polymerization method is preferably a perfluorocarboxylic acid type emulsifying agent.

The polymerization medium to be used in the solution polymerization method is preferably chlorofluorocarbon, hydrochlorofluorocarbon, hydrofluorocarbon, hydrofluoroether or the like, more preferably hydrofluorocarbon or hydrofluoroether which will not damage the ozone layer.

The hydrofluorocarbon is preferably one having from 4 to 10 carbon atoms, more preferably from 4 to 8 carbon atoms. If the hydrofluorocarbon has less than 4 carbon atoms or more than 10 carbon atoms, the boiling point of such a hydrofluorocarbon will be out of the desired temperature range (from 0 to 200° C., preferably from 10 to 100° C.). That is, when the hydrofluorocarbon has at least 4 carbon atoms, its boiling point is at least 0° C., such being suitable for storage and transfer. When the hydrofluorocarbon has at most 10 carbon atoms, its boiling point is at most 200° C., whereby the polymerization medium will easily be recovered from the slurry after polymerization.

The hydrofluorocarbon is preferably one having a ratio of the number of hydrogen atoms/the number of fluorine atoms (hereinafter referred to as H/F) on a molar basis of from 0.05 to 20, more preferably from 0.06 to 1. If the H/F ratio is less than 0.05, the solubility of the polymerization initiator described hereinafter will be insufficient. If the H/F ratio exceeds 20, the chain transfer constant of the polymerization reaction tends to be large, whereby a fluorinated copolymer having a desired molecular weight will not be obtained.

The molecular structure of the hydrofluorocarbon may be linear or branched.

As specific examples of the hydrofluorocarbon, the following compounds are mentioned.

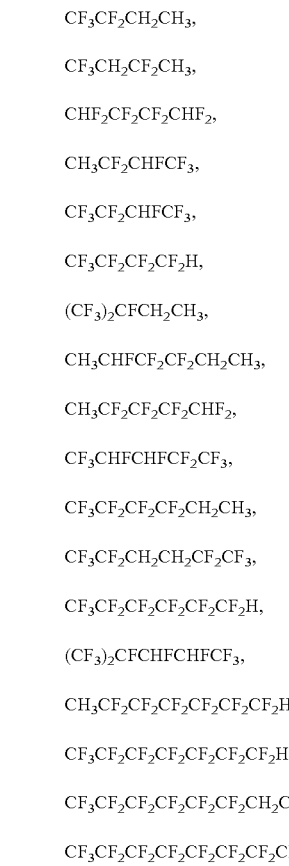

Since if the number of carbon atoms is too small, the boiling point tends to be too low, if the number of carbon atoms is too many, the boiling point tends to be too high, and if the number of hydrogen atoms is large, a copolymer having a high molecular weight will hardly be obtained, the hydrofluorocarbon is preferably a hydrofluorocarbon represented by $C_{n+m}F_{2n+1}H_{2m+1}$ (wherein n is an integer of from 2 to 8, and m is an integer of from 0 to 3), more preferably $CF_3CF_2CF_2CF_2CF_2CF_2H$ (1,1,1,2,2,3,3,4,4,5,5,6,6-tridecafluorohexane, H/F ratio: 0.077), $CF_3CF_2CF_2CF_2CH_2CH_3$ (1,1,1,2,2,3,3,4,4-nonafluorohexane, H/F ratio: 0.56) or $CF_3CF_2CF_2CF_2CF_2CF_2CH_2CH_3$ (1,1,1,2,2,3,3,4,4,5,5,6,6-tridecafluorooctane, H/F ratio: 0.38).

The hydrofluoroether is a hydrofluoroalkyl ether (hereinafter referred to as HFE represented by the following formula (4):

$$R^4\text{—}O\text{—}R^5 \qquad (4)$$

Each of $R^4$ and $R^5$ is a polyfluoroalkyl group, at least one of $R^4$ and $R^5$ has a hydrogen atom, and the total number of carbon atoms of $R^4$ and $R^5$ is from 3 to 8. The polyfluoroalkyl group is preferably a linear or branched hydrofluoroalkyl group or perfluoroalkyl group. In a case where either one of $R^4$ and $R^5$ is a perfluoroalkyl group, the other is a hydrofluoroalkyl group. If both $R^4$ and $R^5$ are a perfluoroalkyl group, such a compound has a high global warming potential. Further, $R^4$ and $R^5$ may be polyfluoroalkyl groups which are the same or different. The total number of fluorine atoms which $R^4$ and $R^5$ have is preferably larger than the total number of hydrogen atoms. If the number of hydrogen atoms is large, the chain transfer constant tends to be large, and accordingly the number of hydrogen atoms is preferably smaller, whereby the chain transfer constant will be smaller. The total number of fluorine atoms which $R^4$ and $R^5$ have is preferably at least 60%, more preferably at least 65% to the total number of hydrogen atoms and fluorine atoms. The total number of carbon atoms of $R^4$ and $R^5$ is from 3 to 8, preferably from 4 to 6. If the number of carbon atoms of $R^4$ and $R^5$ is too small, such a compound tends to have a low boiling point, and its handling efficiency as a polymerization medium is insufficient. If the number of carbon atoms of $R^4$ and $R^5$ is too large, such a compound has a high boiling point, and separation of a fluorinated copolymer and the polymerization medium tends to be difficult.

HFE is preferably at least one member selected from the group consisting of $CF_3CH_2OCF_2CHF_2$, $CHF_2CF_2CH_2OCF_2CHF_2$ and $CF_3CF_2CH_2OCF_2CHF_2$, more preferably $CF_3CH_2OCF_2CHF_2$.

The proportions of charge of the fluorinated monomer having a carboxylic acid functional group or a sulfonic acid functional group and the fluorinated olefin are selected so that the proportion of the monomer units in the obtainable fluorinated copolymer is within a desired range.

The proportion of charge of the fluorinated monomer having a carboxylic acid functional group or a sulfonic acid functional group is preferably such that the proportion of the units of the fluorinated monomer having a carboxylic acid functional group or a sulfonic acid functional group in the fluorinated copolymer is from 15 to 95 mass %.

The proportion of charge of TFE is preferably such that the proportion of the TFE units in the fluorinated copolymer is from 5 to 85 mass %.

The proportion of charge of another monomer is preferably such that the proportion of the units of another monomer in the fluorinated copolymer is from 0 to 30 mass %.

The respective monomers may be charged all at once, or may be charged continuously or intermittently. From a viewpoint such that the concentration of each monomer in the reaction system is constant so that the composition of the fluorinated copolymer to be formed is uniform, it is preferred to continuously add and continuously react the fluorinated monomer having a carboxylic acid functional group or a sulfonic acid functional group and TFE.

The amount of addition of the polymerization initiator is preferably at most 0.1 part by mass per 100 parts by mass of all the monomers, more preferably 0.05 part by mass. By reducing the amount of addition of the polymerization initiator, the molecular weight of the fluorinated copolymer can be made high. In addition to the polymerization initiator, a molecular weight-controlling agent or the like commonly used for solution polymerization may be added.

The molecular weight-controlling agent is preferably an alcohol (such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol), a hydrocarbon (such as n-pentane, n-hexane or cyclohexane), a hydrofluorocarbon (such as $CF_2H_2$), a ketone (such as acetone), a mercaptan (such as methylmercaptan), an ester (such as methyl acetate or ethyl acetate), or an ether (such as diethyl ether or methyl ethyl ether), more preferably an alcohol.

The amount of the molecular weight-controlling agent is preferably from 0.0001 to 50 parts by mass, more preferably from 0.001 to 10 parts by mass per 100 parts by mass of all the monomers.

The polymerization pressure (gauge pressure) is preferably from 0.1 to 5.0 MPaG, more preferably from 0.5 to 2.0 MPaG. Within such a range, the polymerization rate can be maintained to be a practically satisfactory level, and a high molecular weight fluorinated copolymer can be obtained.

The conditions and operations other than the polymerization pressure are not particularly limited, and reaction conditions can be selected from a wide range. For example, an optimum polymerization temperature is selected depending upon the type of the monomer, the reaction molar ratio and the like, and in view of industrial applicability, the polymerization temperature is preferably from 20 to 100° C., more preferably from 30 to 90° C.

(Steps (II) and (II'))

In the case of the production process according to a first embodiment of the present invention, while the mixture (emulsion or slurry) in the reactor is continuously or intermittently transferred to an evaporation container equipped with a stirring machine, the mixture is continuously heated in the evaporation container with stirring, to continuously evaporate and recover the unreacted monomer and the polymerization medium and separate them from the fluorinated copolymer.

In the case of the production process according to a second embodiment of the present invention, while the mixture in the reactor is continuously or intermittently transferred to an evaporation container equipped with a stirring machine, the mixture is continuously heated in the evaporation container with stirring to continuously evaporate and recover the unreacted monomer to separate it from the fluorinated copolymer.

Since the fluorinated monomer having a carboxylic acid functional group or a sulfonic acid functional group may be decomposed by oxygen or moisture, the evaporation container is preferably capable of stirring the mixture transferred in an inert gas (e.g. nitrogen gas) atmosphere, in vacuum or reduced-pressure atmosphere.

As a stirring blade in the stirring machine, a paddle blade, a turbine blade, an anchor blade, a helical ribbon blade or the like is preferred. The stirring machine may have a scraping blade rotating while being rubbed against the wall surface, so as to prevent deposition of the fluorinated copolymer on the inner wall of the evaporation container. The stirring blade is preferably an anchor blade or a helical ribbon blade suitable for mixing a liquid having a high viscosity, and is particularly preferably a helical ribbon blade.

Although the optimum number of revolutions varies depending upon the shape of the stirring blade and the size of the evaporation container, the number of revolutions is preferably from about 10 to about 500 rpm, more preferably from 20 to 300 rpm, further preferably from 30 to 250 rpm. When the number of revolutions is at least 10 rpm, agglomeration of the fluorinated copolymer in the evaporation container can further be suppressed, and inhibition of heat transfer by the agglomerated fluorinated copolymer in the evaporation container is less likely to occur, and the polymerization medium and the unreacted monomer will more efficiently be recovered. When the number of revolutions is at most 500 rpm, a high capacity motor will not be necessary, whereby the cost of the apparatus can further be suppressed.

The evaporation container is preferably one which can be heated e.g. by a jacket, so as to evaporate the polymerization medium or the unreacted monomer. The heating medium is preferably water vapor, an oil, warm water or the like. The heating temperature is preferably from 20 to 200° C., more preferably from 40 to 180° C., further preferably from 50 to 150° C. The heating temperature is decided by the boiling points of the polymerization medium and the fluorinated monomer, and is preferably within the above temperature range, since the fluorinated monomer may be thermally decomposed. In order that the polymerization medium and the unreacted monomer are evaporated at a lower temperature, the pressure in the evaporation container may be reduced to the atmospheric pressure or below.

The pressure (absolute pressure) in the evaporation container is preferably from 0.1 to 200 kPa, more preferably from 0.5 to 100 kPa.

The mixture is continuously or intermittently transferred to the evaporation container. The mixture is preferably continuously transferred to the evaporation container. "The mixture is continuously transferred to the evaporation container" means a state where the mixture is always supplied to the evaporation container, and "the mixture is intermittently transferred to the evaporation container" means a state where a time when the mixture is supplied to the evaporation container and a time when it is not are alternately present. The supply amount per unit time may be constant or inconstant. If the mixture is charged into the evaporation container all at once and it is heated with stirring to evaporate and recover the polymerization medium and the unreacted monomer in such a state, the fluorinated copolymer will be agglomerated, the heat transfer from the evaporation container to the agglomerated fluorinated copolymer will be inhibited, and the polymerization medium and the unreacted monomer contained in the agglomerated fluorinated copolymer are hardly heated. Accordingly, the polymerization medium and the unreacted monomer cannot efficiently be recovered.

The supply amount per unit time when the mixture is transferred from the reactor to the evaporation container varies depending upon the size of the evaporation container and the type of the stirring machine, and is preferably adjusted to a transfer rate to such an extent that the heat transfer to the fluorinated copolymer in the interior of the evaporation container will not be remarkably deteriorated. Specifically, it is preferably such an extent that the temperature in the interior of the evaporation container can be maintained to a temperature in the vicinity of the boiling point of the polymerization medium or the fluorinated monomer. More specifically, it is preferably such an extent that the temperature in the interior of the evaporation container can be maintained to be from −20° C. to +20° C. from the higher one of the boiling points of the polymerization medium and the fluorinated monomer under the pressure in the evaporation container. In order that the internal temperature of the evaporation container is within the above temperature range, the mixture may be heated before supplied to the evaporation container. Further, it is preferred to transfer the mixture to the evaporation container so that the overall coefficient of heat transfer is at least 80 kJ/m²·h·° C., more preferably at least 100 kJ/m²·h·° C., most preferably at least 150 kJ/m²·h·° C. If the heat of evaporation of the polymerization medium and the fluorinated monomer will not exceed the amount of heat by heating, the internal temperature of the evaporation container will not be lower than the boiling points of the polymerization medium and the fluorinated monomer, and the fluorinated copolymer will not be agglomerated to inhibit heat transfer, whereby the recovery ratio of the unreacted monomer will be improved. When a sufficient amount of heat to evaporate the polymerization medium and the fluorinated monomer is supplied, the internal temperature of the evaporation container will not be remarkably higher than the boiling points of the polymerization medium and the fluorinated monomer, a fluorinated copolymer in the form of particles will be formed without consuming unnecessary thermal energy, the process time can be shortened, and the productivity will be improved.

The overall coefficient of heat transfer is a coefficient representing the heat transfer and is obtained from the following formula (5):

$$Q=UA\Delta T \qquad (5)$$

wherein Q is the amount of heat, U is the overall coefficient of heat transfer, A is the heat transfer area, and $\Delta T$ is the temperature difference between the interior and the exterior.

As a method of recovering the evaporated unreacted monomer and polymerization medium, a method may, for example, be mentioned in which the evaporation container is evacuated or air by means of a cold trap or a heat exchanger, to recover the unreacted monomer and the polymerization medium.

(Fluorinated Copolymer)

The fluorinated copolymer obtainable by the production process of the present invention is a fluorinated copolymer of a fluorinated monomer having a carboxylic acid functional group or a sulfonic acid functional group, and a fluorinated olefin.

The average particle size of the fluorinated copolymer is preferably from 0.10 to 10 mm, more preferably from 0.3 to 8.0 mm, particularly preferably from 0.5 to 3.0 mm. When the average particle size of the fluorinated copolymer is within such a range, heat transfer from the evaporation container to the fluorinated copolymer will efficiently be carried out. The average particle size of the fluorinated copolymer can be evaluated by a sieving method.

The amount of the fluorinated monomer having a carboxylic acid functional group or a sulfonic acid functional group remaining in the fluorinated copolymer is preferably at most 1.0 mass %, more preferably at most 0.5 mass %, further preferably at most 0.3 mass % per 100 mass % of the fluorinated copolymer. When the amount of the remaining unreacted monomer is within the above range, the fluorinated monomer which is expensive can be efficiently recovered, whereby the production cost for the fluorinated copolymer can be suppressed.

The ion exchange capacity of the fluorinated copolymer is preferably from 0.5 to 2.0 meq/g dry resin when the fluorinated copolymer is used for an ion exchange membrane. Even when the ion exchange capacity of the fluorinated copolymer is high, the molecular weight of the fluorinated copolymer can be made high, whereby the mechanical property and the durability of the fluorinated copolymer will not be deteriorated. The ion exchange capacity of the fluorinated copolymer is preferably at least 0.6 meq/g dry resin, more preferably at least 0.7 meq/g dry resin, in view of the mechanical property and the electrochemical performance as an ion exchange membrane.

The molecular weight of the fluorinated copolymer relates to the mechanical performance and the film-forming property as an ion exchange membrane. The molecular weight of the fluorinated copolymer is preferably at least 150° C., more preferably from 170 to 350° C., further preferably from 170 to 330° C. by the TQ value.

The TQ value is a value relating to the molecular weight of a polymer, and is represented by a temperature at which the volume flow rate is 100 mm³/sec. The volume flow rate is the amount of a polymer extruded represented by the unit mm³/sec, when a polymer is melted and extruded from a orifice (diameter: 1 mm, length: 1 mm) at a certain temperature under an elevated pressure of 3 MPa. The TQ value is an index of the molecular weight of a polymer, and the higher the TQ value, the higher the molecular weight.

(Steps (III) and (III'))

In the case of the production process according to a first embodiment of the present invention, a mixed liquid of the unreacted monomer and the polymerization medium recovered in the step (II) is subjected to heat treatment in the absence of TFE.

In the case of the production process according to a second embodiment of the present invention, the unreacted monomer recovered in the step (II') is subjected to heat treatment in the absence of TFE.

A heating container is heated e.g. by a jacket in order that the undecomposed polymerization initiator contained in the mixed liquid of the unreacted monomer and the polymerization medium or in the unreacted monomer (hereinafter referred to as recovered liquid) is decomposed. The heating temperature should be at least the 10-hour half-life temperature of the polymerization initiator used in the step (I), preferably from 30 to 150° C., more preferably from 40 to 130° C., further preferably from 50 to 100° C. If the heating temperature exceeds the above range, the fluorinated monomer may be decomposed, and if it is less than the above range, decomposition of the polymerization initiator will hardly proceed, and the time required for the process tends to be long, and accordingly the above temperature range is preferred.

The concentration of the undecomposed polymerization initiator contained in the recovered liquid after the heat treatment is preferably at most 0.01 mass %, more preferably at most 0.005 mass %, further preferably at most 0.0001 mass % to the recovered liquid. When the concentration of the undecomposed polymerization initiator is within the above range, an ion exchange membrane with a high current efficiency will be obtained.

(Reuse of Fluorinated Monomer)

In the case of the production process according to a first embodiment of the present invention, the recovered mixed liquid containing the unreacted monomer and the polymerization medium treated in the step (III) is preferably used as at least part of the fluorinated monomer and the polymerization medium to be used in the step (I).

Further, in the case of the production process according to a second embodiment of the present invention, it is preferred to use the fluorinated monomer treated in the step (III') as at least part of the fluorinated monomer to be used in the step (I').

In reuse of the fluorinated monomer, it is preferred to add one or more of fluorinated monomers to cover a deficiency, so as to achieve the composition of the fluorinated monomer used in the step (I) or (I').

Reuse of the fluorinated monomer is carried out, in the same manner as in the step (I), by polymerizing the fluorinated monomer having a carboxylic acid functional group or a sulfonic acid functional group including the fluorinated monomer to be reused, and TFE, in a polymerization medium in the presence of a polymerization initiator to obtain a mixture containing the fluorinated copolymer, the unreacted monomer and the polymerization medium.

Further, it is carried out, in the same manner as in the step (I'), by polymerizing the fluorinated monomer having a carboxylic acid functional group or a sulfonic acid functional group including the fluorinated monomer to be reused, and TFE, in the presence of a polymerization initiator without using a polymerization medium to obtain a mixture containing the fluorinated copolymer and the unreacted monomer.

In reuse of the fluorinated monomer, after completion of the step (I) or (I'), the steps (II) and (III), or the steps (II') and (III') may be carried out.

(Ion Exchange Membrane)

An ion exchange membrane can be obtained by forming the fluorinated copolymer obtained by the present invention into a membrane. A process for producing an ion exchange membrane comprises a step of forming the fluorinated copolymer into a membrane and a step of converting the carboxylic acid functional groups or the sulfonic acid functional groups in the fluorinated copolymer to a carboxylic acid by hydrolysis. Either of the membrane-forming step and the conversion step may be carried out first, however, it is preferred to carry out the membrane-forming step first and then carry out the conversion step.

The ion exchange membrane may be a laminate having a plurality of layers containing the fluorinated copolymer obtained by the production process of the present invention, the layers being differing in the ion exchange capacity of the fluorinated copolymer; may be a laminate of a layer containing the fluorinated copolymer having carboxylic acid functional groups and a layer containing the fluorinated copolymer having sulfonic acid functional groups, each obtained by the production process of the present invention; or may be a laminate having a reinforcing material.

The sulfonic acid functional group is a sulfonic acid group ($-SO_3H$) itself or a functional group capable of being converted to a sulfonic acid group by hydrolysis or neutralization. The functional group capable of being converted to a sulfonic acid group may, for example, be $-SO_3M$, $-SO_2F$, $-SO_2Cl$ or $-SO_2Br$.

The reinforcing material may, for example, be woven fabric (cloth), fibers or nonwoven fabric.

The ion exchange membrane may be applicable to alkali chloride electrolysis, dialysis, ozone electrolysis, electrolytic reduction, a diaphragm for a fuel cell, a polymer catalyst and the like, and is suitable for alkali chloride electrolysis of e.g. sodium chloride.

(Function and Effect)

When the mixture of the unreacted monomer and the polymerization medium is subjected to heat treatment in the absence of TFE, the fluorinated monomer having a carboxylic acid functional group or a sulfonic acid functional group is inferior in the reactivity to TFE. Accordingly, the polymerization initiator can be decomposed without polymerization reaction. However, when the mixture of the unreacted monomer and the polymerization medium is subjected to heat treatment in the presence of TFE, a polymerization reaction will proceed by the undecomposed initiator, and a fluorinated polymer will be formed. Accordingly, if the mixed liquid of the unreacted monomer and the polymerization medium recovered without heat treatment in the step (III) or (III') is reused for polymerization, a fluorinated copolymer having an unintended composition will form in the step of charging the mixture to a reaction container and increasing the temperature and the pressure, and the current efficiency of the obtainable ion exchange membrane will be lowered. After the step (III) or (III'), since the polymerization initiator is decomposed, when the fluorinated monomer after completion of the step (III) or (III') is reused for the step (I) or (I'), unintended polymerization reaction in the step of charging the mixture to a reaction container and increasing the temperature and the pressure, can be prevented.

As a result, according to the process for producing a fluorinated copolymer of the present invention, the unreacted monomer recovered from the mixture containing the fluorinated copolymer and the unreacted monomer can be reused for polymerization efficiently.

EXAMPLES

Now, the present invention will be described in further detail with reference to Examples. However, it should be understood that the present invention is by no means restricted to such specific Examples.

(TQ Value)

The TQ value is a value relating the molecular weight of a polymer, and represents a temperature at which the volume flow rate is 100 mm$^3$/sec. The volume flow rate is represented by the amount of a fluorinated copolymer extruded represented by the unit mm$^3$/sec when the fluorinated copolymer is melted and extruded from an orifice (diameter: 1 mm, length: 1 mm) at a constant temperature under an elevated pressure of 3 MPa, using Shimadzu Flow Tester CFT-100D (manufactured by Shimadzu Corporation).

(Ion Exchange Capacity)

About 0.5 g of a fluorinated copolymer is formed into a film by flat-plate pressing at a temperature higher by about 10° C. than the TQ value, the film was analyzed by a transmission infrared spectroscopic analyzer, and employing the peak heights of a $CF_2$ peak, a $CF_3$ peak and a OH peak in the obtained spectrum, the ion exchange capacity was calculated.

(Preparation of Ion Exchange Membrane)

A fluorinated copolymer (ion exchange capacity: 1.07 meq/g dry resin, TQ: 235° C.) (hereinafter referred to as polymer C) of TFE and a perfluorovinyl ether compound having a carboxylic acid functional group represented by the following formula (1-1) was prepared.

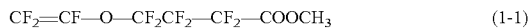
$$CF_2\!=\!CF\!-\!O\!-\!CF_2CF_2\!-\!CF_2\!-\!COOCH_3 \quad (1\text{-}1)$$

A fluorinated copolymer (ion exchange capacity: 1.10 meq/g dry resin, TQ: 235° C.) (hereinafter referred to as polymer S) of TFE and a perfluorovinyl ether compound having a sulfonic acid functional group represented by the following formula (2-1) was prepared:

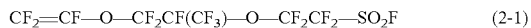
$$CF_2\!=\!CF\!-\!O\!-\!CF_2CF(CF_3)\!-\!O\!-\!CF_2CF_2\!-\!SO_2F \quad (2\text{-}1)$$

Polymer C and polymer S obtained in the after-mentioned Examples 1 or 2 or Comparative Example 1, or polymer C and polymer S obtained in the after-mentioned Example 3, were subjected to coextrusion to obtain film A of a two layer structure comprising a layer (thickness: 18 μm) of polymer C and a layer (thickness: 65 μm) of polymer S. Further, polymer S was subjected to melt-extrusion to obtain film B (thickness: 30 μm).

Monofilament polytetrafluoroethylene (hereinafter referred to as PTFE) yarns obtained by rapidly stretching a PTFE film, followed by slitting into 100 denier, and multifilament polyethylene terephthalate (hereinafter referred to as PET) yarns obtained by drawing and twisting 6 PET filaments of 5 denier, were subjected to plane weaving in an alternating arrangement of two PET yarns to one PTFE yarn, to obtain a reinforcing woven fabric (yarn density: 30 yarns/cm). The woven fabric was flattened by a roll press so that the thickness of the woven fabric became about 80 μm.

The woven fabric and film thus obtained were overlaid in the order of film B, the woven fabric, film A and a releasing PET film (thickness: 100 μm) so that the layer of polymer C of film A would be on the releasing PET film side and laminated by means of rollers. Then, the releasing PET film was peeled to obtain a reinforced laminated membrane.

A paste comprising 29.0 mass % of zirconium oxide (average particle size: 1 μm), 1.3 mass % of methylcellulose, 4.6 mass % of cyclohexanol, 1.5 mass % of cyclohexanone and 63.6 mass % of water was transferred by a roll press on the film B side of the laminated membrane to attach a gas-releasing covering layer. The attached amount of zirconium oxide was 20 g/m$^2$.

The gas-releasing covering layer-attached laminated membrane was immersed in an aqueous solution of 5 mass % of dimethylsulfoxide and 30 mass % of potassium hydroxide at 95° C. for 10 minutes to hydrolyze —COOCH$_3$ of polymer C and —SO$_2$F of polymer S to be converted to ion exchange groups.

A dispersion having zirconium oxide (average particle size: 1 μm) dispersed at a concentration of 13 mass % in an ethanol solution containing 2.5 mass % of an acid-form polymer of polymer S, was prepared. This dispersion was sprayed to the film A side of the laminated membrane after the hydrolysis to attach a gas-releasing covering layer, thereby to obtain an ion exchange membrane. The attached amount of zirconium oxide was 3 g/m$^3$.

(Evaluation of Ion Exchange Membrane)

The obtained ion exchange membrane was disposed in an electrolytic cell so that film A faced the cathode, and electrolysis of a sodium chloride aqueous solution was carried out.

As the electrolytic cell (effective current-carrying area: 25 cm$^2$), an electrolytic cell in which the inlet of water to be supplied to the cathode compartment was disposed at a lower part of the cathode compartment, the outlet of the formed sodium hydroxide aqueous solution was disposed at an upper part of the cathode compartment, the inlet of a sodium chloride aqueous solution to the anode compartment was disposed at a lower part of the anode compartment, and the outlet of the sodium chloride aqueous solution diluted by the electrolysis reaction was disposed at an upper part of the anode compartment, was used.

As the anode, one having a titanium punched metal (short diameter: 4 mm, long diameter: 8 mm) coated with a solid solution of ruthenium oxide, iridium oxide and titanium oxide, was used.

As the cathode, one having ruthenium-containing Raney nickel electrically deposited on a SUS304 punched metal (short diameter: 5 mm, long diameter: 10 mm) was used.

Electrolysis of a sodium chloride aqueous solution was carried out as follows.

The electrolysis was carried out for 1 week by bringing the cathode side in a pressurized state so that the anode and the ion exchange membrane would be in contact with each other, while supplying a 290 g/L sodium chloride aqueous solution and water to the anode compartment and the cathode compartment, respectively, and maintaining the sodium chloride concentration discharged from the anode compartment to be 190 g/L and the sodium hydroxide concentration discharged from the cathode compartment to be 32 mass %, under such conditions that the temperature would be 90° C. and the current density would be 6 kA/m$^2$, whereby the current efficiency one week later was measured.

Example 1

Step (I)

A stainless steel reactor (autoclave) having an internal capacity of 94 L was evacuated of air, and in the reactor, 53.5 kg of a solution obtained by dissolving 36.6 mass % of a perfluorovinyl ether compound (hereinafter referred to as monomer A) having a carboxylic acid functional group represented by the following formula (1-1) in $CF_3CF_2CF_2CF_2CF_2CF_2H$ (H/F ratio: 0.077, hereinafter referred to as solvent A) was charged and heated until the internal temperature in the reactor became 67° C.:

$$CF_2\!=\!CF\!-\!O\!-\!CF_2CF_2\!-\!CF_2\!-\!COOCH_3 \quad (1\text{-}1)$$

TFE was introduced until the internal pressure in the reactor became 0.95 MPaG, and 4.0 L of a solution obtained by dissolving 0.35 mass % of azobisisobutyronitrile as a polymerization initiator in solvent A was charged to initiate the polymerization. During the polymerization reaction, TFE was continuously introduced so as to maintain a pressure of 0.95 MPaG, and in addition, monomer A was continuously added in an amount corresponding to a TFE/monomer A molar ratio of 6.3. When the amount of TFE introduced from the initiation of the reaction reached 3.6 kg, the reactor was cooled to 40° C., and unreacted TFE was discharged out of the system to complete the polymerization. The obtained mixture of fluorinated copolymer, solvent A and monomer A will be referred to as slurry A. Further, solvent A was added so that the concentration of fluorinated copolymer contained in slurry A became 10 mass % to prepare slurry B.

Step (II)

A stainless steel autoclave having an internal capacity of 10 L provided with a helical ribbon stirring blade was evacuated of air to a degree of vacuum of 4 kPaA. Further, through a jacket of the autoclave, a steam under a pressure of 0.3 MPaG was made to flow at a rate of 2 kg/h for heating.

While the stirring machine of the autoclave was rotated at a rate of 85 rpm, slurry B was continuously transferred to evaporate and recover the polymerization medium and monomer A. While slurry B was transferred, the rate of transfer of slurry B was adjusted to maintain an internal pressure in the autoclave of from 2 to 10 kPaA and an internal temperature of from 55 to 65° C. (the boiling point of monomer A under the above pressure is from 40 to 70° C.), and 75 kg of slurry B was treated over a period of 3 hours (average supply amount per unit time: 25 kg/h). The autoclave was cooled, the pressure was recovered to normal pressure by nitrogen gas and the autoclave was opened, whereupon fluorinated copolymer in the form of particles was obtained. Further, the amount of azobisisobutyronitrile contained in a recovered mixed liquid (solution C) of the polymerization medium and monomer A was 0.02 mass %.

Step (III)

A stainless steel autoclave having an internal capacity of 94 L was evacuated of air, and in the autoclave, 46.5 kg of solution C and 7 kg of monomer A were charged, the pressure was elevated up to 0.22 MPaG by nitrogen, and the temperature was raised until the internal temperature in the reactor became 85° C., followed by heating for 8 hours. The amount of azobisisobutyronitrile contained in a mixed liquid (solution D) of solution C and monomer A after the treatment was at most 0.00001 mass %.

Using the obtained solution D, fluorinated copolymer was obtained in accordance with the steps (I) and (II). Of the obtained fluorinated copolymer, the ion exchange capacity was 1.07 meq/g dry resin, and the TQ value was 236° C.

Further, using the obtained fluorinated copolymer, an ion exchange membrane was prepared and evaluated, whereupon the current efficiency one week after initiation of the electrolysis was 96.0%.

Example 2

Step (I)

A stainless steel autoclave having an internal capacity of 94 L was evacuated of air, and in the reactor, 53.5 kg of a solution obtained by dissolving 37.4 mass % of monomer A in solvent A was charged and heated until the internal temperature in the reactor became 75° C.:

TFE was introduced until the internal pressure in the reactor became 0.95 MPaG, and 4.0 L of a solution obtained by dissolving 0.031 mass % of azobisisobutyronitrile as a polymerization initiator in solvent A was charged to initiate the polymerization. During the polymerization reaction, TFE was continuously introduced so as to maintain a pressure of 0.95 MPaG, and in addition, monomer A was continuously added in an amount corresponding to a TFE/monomer A molar ratio of 6.2. When the amount of TFE introduced from the initiation of the reaction reached 3.6 kg, the reactor was cooled to 40° C., and unreacted TFE was discharged out of the system to complete the polymerization to obtain slurry A', and solvent A was added so that the concentration of fluorinated copolymer contained in slurry A' became 9 mass % to prepare slurry B'.

Step (II)

A stainless steel autoclave having an internal capacity of 10 L provided with a helical ribbon stirring blade was evacuated of air to a degree of vacuum of 4 kPaA. Further, through a jacket of the autoclave, a steam under a pressure of 0.3 MPaG was made to flow at a rate of 2 kg/h for heating.

While the stirring machine of the autoclave was rotated at a rate of 120 rpm, slurry B' was continuously transferred to evaporate and recover the polymerization medium and monomer A. While slurry B' was transferred, the rate of transfer of slurry B' was adjusted to maintain an internal pressure in the autoclave of from 2 to 10 kPaA and an internal temperature of from 55 to 65° C. (the boiling point of monomer A under the above pressure is from 40 to 70° C.), and 75 kg of slurry B' was treated over a period of 3 hours (average supply amount per unit time: 25 kg/h). The autoclave was cooled, the pressure was recovered to normal pressure by nitrogen gas and the autoclave was opened, whereupon fluorinated copolymer in the form of particles was obtained. Further, the amount of azobisisobutyronitrile contained in recovered solution C' was 0.0002 mass %.

Step (III)

A stainless steel autoclave having an internal capacity of 94 L was evacuated of air, and in the autoclave, 46.5 kg of solution C' and 7 kg of monomer A were charged, the pressure was elevated up to 0.22 MPaG by nitrogen, and the temperature was raised until the internal temperature in the reactor became 85° C., followed by heating for 4 hours. The amount of azobisisobutyronitrile contained in solution D' after the treatment was at most 0.00001 mass %.

Using the obtained solution D', fluorinated copolymer was obtained in accordance with the steps (I) and (II). Of the obtained fluorinated copolymer, the ion exchange capacity was 1.08 meq/g dry resin, and the TQ value was 225° C.

Further, using the obtained fluorinated copolymer, an ion exchange membrane was prepared and evaluated, whereupon the current efficiency one week after initiation of the electrolysis was 96.5%.

Comparative Example 1

Steps (I) and (II)

Using 46.5 kg of solution C obtained in the step (II) in Example 1 and 7 kg of monomer A, fluorinated copolymer was obtained in accordance with the steps (I) and (II) in Example 1. Of the obtained fluorinated copolymer, the ion exchange capacity was 1.06 meq/g dry resin, and the TQ value was 233° C.

Further, using the obtained fluorinated copolymer, an ion exchange membrane was prepared and evaluated, whereupon the current efficiency one week after initiation of the electrolysis was 93.5%.

Example 3

Step (I)

A stainless steel autoclave having an internal capacity of 94 L was evacuated of air, and in the reactor, 42.0 kg of a solution obtained by dissolving 69.8 mass % of a perfluorovinyl ether compound (hereinafter referred to as monomer B) having a sulfonic acid functional group represented by the following formula (1-2) in solvent A was charged and heated until the internal temperature in the reactor became 75° C.:

$$CF_2=CF-O-CF_2CF(CF_3)OCF_2CF_2-SO_2F \quad (1\text{-}2)$$

TFE was introduced until the internal pressure in the reactor became 1.085 MPaG, and 2.0 L of a solution obtained by dissolving 0.16 mass % of dimethyl 2,2'-azobisisobutyrate as a polymerization initiator in solvent A was charged to initiate the polymerization. During the polymerization reaction, TFE was continuously introduced so as to maintain a pressure of 1.085 MPaG. When the amount of TFE introduced from the initiation of the reaction reached 4.1 kg, the reactor was cooled to 40° C., and unreacted TFE was discharged out of the system to complete the polymerization. The obtained mixture of fluorinated copolymer, solvent A and monomer B will be referred to as slurry E. Further, solvent A was added so that the concentration of fluorinated copolymer contained in slurry E became 10 mass % to prepare slurry F.

Step (II)

A stainless steel autoclave having an internal capacity of 10 L provided with a helical ribbon stirring blade was evacuated of air to a degree of vacuum of 4 kPaA. Further, through a jacket of the autoclave, a steam under normal pressure was made to flow at a rate of 10 kg/h for heating.

While the stirring machine of the autoclave was rotated at a rate of 150 rpm, slurry F was continuously transferred to evaporate and recover the polymerization medium and monomer B. While slurry F was transferred, the rate of transfer of slurry F was adjusted to maintain an internal pressure in the autoclave of from 2 to 20 kPaA and an internal temperature of from 55 to 65° C. (the boiling point of monomer B under the above pressure is from 42 to 90° C.), and 87 kg of slurry F was treated over a period of 8 hours (average supply amount per unit time: 11 kg/h). The autoclave was cooled, the pressure was recovered to normal pressure by nitrogen gas and the autoclave was opened, whereupon fluorinated copolymer in the form of particles was obtained. Further, the amount of dimethyl 2,2'-azobisisobutyrate contained in a recovered mixed liquid (solution G) of the polymerization medium and monomer B was 0.0007 mass %.

Step (III)

A stainless steel autoclave having an internal capacity of 94 L was evacuated of air, and in the autoclave, 25.6 kg of solution G and 12.7 kg of monomer B were charged, the pressure was elevated up to 0.22 MPaG by nitrogen, and the temperature was raised until the internal temperature in the reactor became 85° C., followed by heating for 8 hours. The amount of dimethyl 2,2'-azobisisobutyrate contained in a mixed liquid (solution H) of solution G and monomer B after the treatment was at most 0.00001 mass %.

Using the obtained solution H, fluorinated copolymer was obtained in accordance with the steps (I) and (II). Of the obtained fluorinated copolymer, the ion exchange capacity was 1.10 meq/g dry resin, and the TQ value was 229° C.

Further, using the obtained fluorinated copolymer, an ion exchange membrane was prepared and evaluated, whereupon the current efficiency one week after initiation of the electrolysis was 97.0%.

As is evident from the above results, in Examples 1, 2 and 3 according to the present invention, by heating in the step (III) the fluorinated monomer separated from the fluorinated copolymer in the step (II) to decompose the polymerization initiator, the unreacted fluorinated monomer can efficiently be recovered and reused.

According to the process for producing a fluorinated copolymer of the present invention, an unreacted fluorinated monomer can efficiently be recovered and reused, whereby a fluorinated copolymer to be used for an ion exchange membrane for alkali chloride electrolysis can be produced at a low cost.

The entire disclosure of Japanese Patent Application No. 2012-214581 filed on Sep. 27, 2012 including specification, claims and summary is incorporated herein by reference in its entirety.

What is claimed is:

1. A process for producing a fluorinated copolymer, comprising:
   (I) polymerizing a fluorinated monomer having a carboxylic acid functional group or a sulfonic acid functional group and tetrafluoroethylene by a solution polymerization method in a polymerization medium in the presence of a polymerization initiator to obtain a mixture comprising a fluorinated copolymer, an unreacted fluorinated monomer having the carboxylic acid functional group or the sulfonic acid functional group, the polymerization initiator, and the polymerization medium;
   (II) continuously or intermittently transferring the mixture to an evaporation container equipped with a stirring machine and heating the mixture in the evaporation container with stirring to evaporate and recover a mixed liquid comprising the unreacted fluorinated monomer, the polymerization initiator, and the polymerization medium; and
   (III) heating the mixed liquid recovered in the step (II) to decompose the polymerization initiator.

2. The process for producing a fluorinated copolymer according to claim 1, wherein the fluorinated monomer is a perfluoromonomer.

3. The process for producing a fluorinated copolymer according to claim 1, wherein the fluorinated monomer is a fluorovinyl ether represented by formula (1):

$$CF_2=CF-(O)_p-(CH_2)_q-(CF_2CFX)_r-(O)_s- \\ (CF_2)_t(CF_2CFX')_u-A^1 \quad (1)$$

wherein X is a fluorine atom or a trifluoromethyl group, X' is a fluorine atom or a trifluoromethyl group, $A^1$ is a carboxylic acid functional group, p is 0 or 1, q is an integer of from 0 to 12, r is an integer of from 0 to 3, s is 0 or 1, t is an integer of from 0 to 12, u is an integer of from 0 to 3, 1≤p+s, and 1≤r+u.

4. The process for producing a fluorinated copolymer according to claim 1, wherein the fluorinated monomer is a fluorovinyl or a fluorovinyl ether represented by formula (2), (3) or (4):

$$CF_2\!=\!CF\!-\!O\!-\!R^{f2}\!-\!A^2 \qquad (2)$$

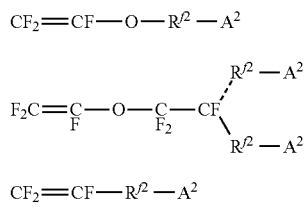

$$CF_2\!=\!CF\!-\!R^{f2}\!-\!A^2 \qquad (4)$$

wherein $R^{f2}$ is a $C_{1\text{-}20}$ perfluoroalkylene group, which may have an etheric oxygen atom and which may be linear or branched, and $A^2$ is a sulfonic acid functional group.

5. The process for producing a fluorinated copolymer according to claim 1, wherein in the step (III), the heat treatment temperature is at least the 10-hour half-life temperature of the polymerization initiator used.

6. The process for producing a fluorinated copolymer according to claim 1, wherein the mixed liquid heated in the step (III) is used as at least part of the fluorinated monomer to be used in the step (I).

7. The process for producing a fluorinated copolymer according to claim 1, wherein, in the step (III), the mixed liquid is heated at a temperature of not more than 150° C.

8. The process for producing a fluorinated copolymer according to claim 1, wherein, in the step (III), the mixed liquid is heated at a temperature of not more than 130° C.

9. The process for producing a fluorinated copolymer according to claim 1, wherein a concentration of the polymerized initiator in the mixed liquid after the step (III) is at most 0.01 mass %.

10. The process for producing a fluorinated copolymer according to claim 1, wherein in the step (II), the mixture was stirred by a paddle blade, a turbine blade, an anchor blade or a helical blade.

11. The process for producing a fluorinated copolymer according to claim 1, wherein in the step (II), the mixture was stirred by a stirring blade, and the number of revolutions of the stirring blade is from 30 to 500 rpm.

12. A process for producing a fluorinated copolymer, comprising:
(I') polymerizing a fluorinated monomer having a carboxylic acid functional group or a sulfonic acid functional group and tetrafluoroethylene by a bulk polymerization method in the presence of a polymerization initiator to obtain a mixture comprising a fluorinated copolymer, the polymerization initiator, and an unreacted fluorinated monomer having the carboxylic acid functional group or the sulfonic acid functional group;
(II') continuously or intermittently transferring the mixture to an evaporation container equipped with a stirring machine and heating the mixture in the evaporation container with stirring to evaporate and recover a mixed liquid comprising the unreacted fluorinated monomer and the polymerization initiator; and
(III') heating the mixed liquid recovered in the step (II') to decompose the polymerization initiator.

13. The process for producing a fluorinated copolymer according to claim 12, wherein the fluorinated monomer is a perfluoromonomer.

14. The process for producing a fluorinated copolymer according to claim 12, wherein the fluorinated monomer is a fluorovinyl ether represented by formula (1):

wherein X is a fluorine atom or a trifluoromethyl group, X' is a fluorine atom or a trifluoromethyl group, $A^1$ is a carboxylic acid functional group, p is 0 or 1, q is an integer of from 0 to 12, r is an integer of from 0 to 3, s is 0 or 1, t is an integer of from 0 to 12, u is an integer of from 0 to 3, 1<p+s, and 1<r+u.

15. The process for producing a fluorinated copolymer according to claim 12, wherein the fluorinated monomer is a fluorovinyl or a fluorovinyl ether represented by formula (2), (3) or (4):

$$CF_2\!=\!CF\!-\!O\!-\!R^{f2}\!-\!A^2 \qquad (2)$$

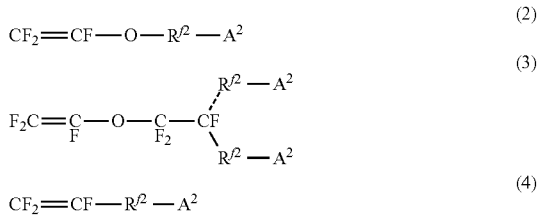

$$CF_2\!=\!CF\!-\!R^{f2}\!-\!A^2 \qquad (4)$$

wherein $R^{f2}$ is a $C_{1\text{-}20}$ perfluoroalkylene group, which may have an etheric oxygen atom and which may be linear or branched, and $A^2$ is a sulfonic acid functional group.

16. The process for producing a fluorinated copolymer according to claim 12, wherein in the step (III'), the heat treatment temperature is at least the 10-hour half-life temperature of the polymerization initiator used.

17. The process for producing a fluorinated copolymer according to claim 12, wherein the fluorinated monomer heated in the step (III') is used as at least part of the fluorinated monomer to be used in the step (I').

18. The process for producing a fluorinated copolymer according to claim 12, wherein, in the step (III'), the mixed liquid is heated at a temperature of not more than 150° C.

19. The process for producing a fluorinated copolymer according to claim 12, wherein, in the step (III'), the mixed liquid is heated at a temperature of not more than 130° C.

20. The process for producing a fluorinated copolymer according to claim 12, wherein a concentration of the polymerized initiator in the mixed liquid after the step (III') is at most 0.01 mass %.

21. The process for producing a fluorinated copolymer according to claim 12, wherein in the step (II'), the mixture was stirred by a paddle blade, a turbine blade, an anchor blade or a helical blade.

22. The process for producing a fluorinated copolymer according to claim 12, wherein in the step (II'), the mixture was stirred by a stirring blade, and the number of revolutions of the stirring blade is from 30 to 500 rpm.

* * * * *